US012745149B2

(12) United States Patent
Fu et al.

(10) Patent No.: US 12,745,149 B2
(45) Date of Patent: Sep. 22, 2026

(54) CELL SELECTION METHOD, TERMINAL AND STORAGE MEDIUM

(71) Applicant: GUANGDONG OPPO MOBILE TELECOMMUNICATIONS CORP., LTD., Dongguan (CN)

(72) Inventors: Zhe Fu, Dongguan (CN); Qianxi Lu, Dongguan (CN); Fei Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 375 days.

(21) Appl. No.: 18/354,085

(22) Filed: Jul. 18, 2023

(65) Prior Publication Data

US 2023/0370926 A1 Nov. 16, 2023

Related U.S. Application Data

(63) Continuation of application No. PCT/CN2021/080874, filed on Mar. 15, 2021.

(51) Int. Cl.
*H04W 36/08* (2009.01)

(52) U.S. Cl.
CPC .................................. *H04W 36/08* (2013.01)

(58) Field of Classification Search
CPC ..................................................... H04W 36/08
See application file for complete search history.

(56) References Cited

U.S. PATENT DOCUMENTS 12,101,675 B2 * 9/2024 Li ..................... H04W 36/0085
2019/0289528 A1 9/2019 Lou et al.
2020/0068473 A1 2/2020 Tang et al.
2022/0225189 A1 * 7/2022 Kang .................... H04W 36/13
2023/0232302 A1 * 7/2023 Li ......................... H04W 48/20

FOREIGN PATENT DOCUMENTS

CN 107223350 9/2017
CN 109246775 1/2019
CN 109803279 5/2019
CN 110603855 12/2019
CN 111149387 5/2020
CN 112449387 3/2021
WO WO-2019095798 A1 * 5/2019 ............ H04W 24/02

OTHER PUBLICATIONS

CNIPA, Second Office Action for CN Application No. 202180076919.7, Feb. 8, 2025.

(Continued)

*Primary Examiner* — Chandrahas B Patel
(74) *Attorney, Agent, or Firm* — Hodgson Russ LLP

(57) ABSTRACT

A cell selection method, a terminal, and a storage medium are provided. The method includes the following. A terminal obtains first information; the first information indicates that a second cell does not support a first intended slice. The terminal performs cell selection or reselection according to the first information.

9 Claims, 4 Drawing Sheets

(56) References Cited

OTHER PUBLICATIONS

"3rd Generation Partnership Project; Technical Specification Group Radio Access Network; NR; User Equipment (UE) procedures in Idle mode and RRC Inactive state (Release 16)," 3GPP TS 38.304, Dec. 2020, v16.3.0.
WIPO, International Search Report and Written Opinion for International Application No. PCT/CN2021/080874, Dec. 6, 2021.
Qualcomm Incorporated, "Discussion on candidate solutions of slice-based cell (re)selection," 3GPP TSG RAN WG2 Meeting #113-e, R2-2100128, Jan. 2021.
Apple, "Scoping of RAN Slicing," 3GPP TSG-RAN WG2 Meeting #111-e, R2-2007088, Aug. 2020.
EPO, Extended European Search Report for EP Application No. 21930696.6, Jan. 2, 2024.
EPO, Communication for EP Application No. 21930696.6, Sep. 12, 2024.
CNIPA, First Office Action for CN Application No. 202180076919.7, Sep. 28, 2024.

* cited by examiner

CELL SELECTION METHOD, TERMINAL AND STORAGE MEDIUM

CROSS-REFERENCE TO RELATED APPLICATION(S)

This application is a continuation of International Application No. PCT/CN2021/080874, filed Mar. 15, 2021, the entire disclosure of which is incorporated herein by reference.

TECHNICAL FIELD

The present application relates to the field of wireless communication technology, and in particular, to a cell selection method and apparatus, a terminal, and a storage medium.

BACKGROUND

In a fifth generation mobile (5G) communication network, network slicing is introduced to reduce delay and enhance mobility, reliability, and accuracy.

Network slicing refers to that some core network elements are isolated and assigned to different network slices, that is, network elements for specific service transmission in the core network elements are assigned to various network slices, and different network slices share an access and mobility management function (AMF). Based on network slicing, services with lower latency, more targeting, greater flexibility, and higher scalability can be provided for multiple businesses with different requirements.

SUMMARY

In one aspect, embodiments of the present disclosure provide a cell selection method. The method is applied to a terminal, and the method includes the following. The terminal obtains first information, where the first information is used for indicating that a second cell does not support a first intended slice, and the second cell is different than the first cell; the terminal performs cell selection or reselection according to the first information.

In still another aspect, embodiments of the present disclosure provide a terminal. The terminal includes a processor, a memory, and a transceiver. The memory stores a computer program. The computer program is executed by the processor to implement the foregoing cell selection method.

In another aspect, embodiments of the present disclosure further provide a non-transitory computer readable storage medium. The storage medium stores a computer program, and the computer program is loaded and executed by a processor to implement the foregoing cell selection method.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

In order to make the objectives, technical solutions, and advantages of the present disclosure clearer, the embodiments of the present disclosure are further described in detail below with reference to the accompanying drawings.

The network architecture and service scenarios described in the embodiments of the present disclosure are intended to describe the technical solutions of the embodiments of the present disclosure more clearly, and do not constitute a limitation to the technical solutions provided in the embodiments of the present disclosure. A person of ordinary skill in the art can know that, with the evolution of the network architecture and the appearance of a new service scenario, the technical solutions provided in the embodiments of the present disclosure are applicable to similar technical problems.

It should be understood that, the term “indicate” mentioned in the embodiments of the present disclosure may be indicating directly, indicating indirectly, or representing having an association. For example, “A indicates B” may be that A directly indicates B, for example, B may be obtained through A, or A indirectly indicates B, for example, A indicates C, and B may be obtained through C; it can also represent that there is an association relationship between A and B.

In the description of the embodiments of the present disclosure, the term “corresponding” may indicate that there is a direct correspondence or indirect correspondence between the two, may also indicate that there is an association between the two, and may also indicate that there is a correspondence such as indicating or being indicated, configuring or being configured.

In the embodiments of the present disclosure, “predefined” can be implemented by pre-storing corresponding codes, tables or other modes that can be used for indicating relevant information in a device (for example, a terminal device and a network device), and the specific implementation of the present disclosure is not limited. For example, “predefined” may refer to “defined” in a protocol.

Figure 1:
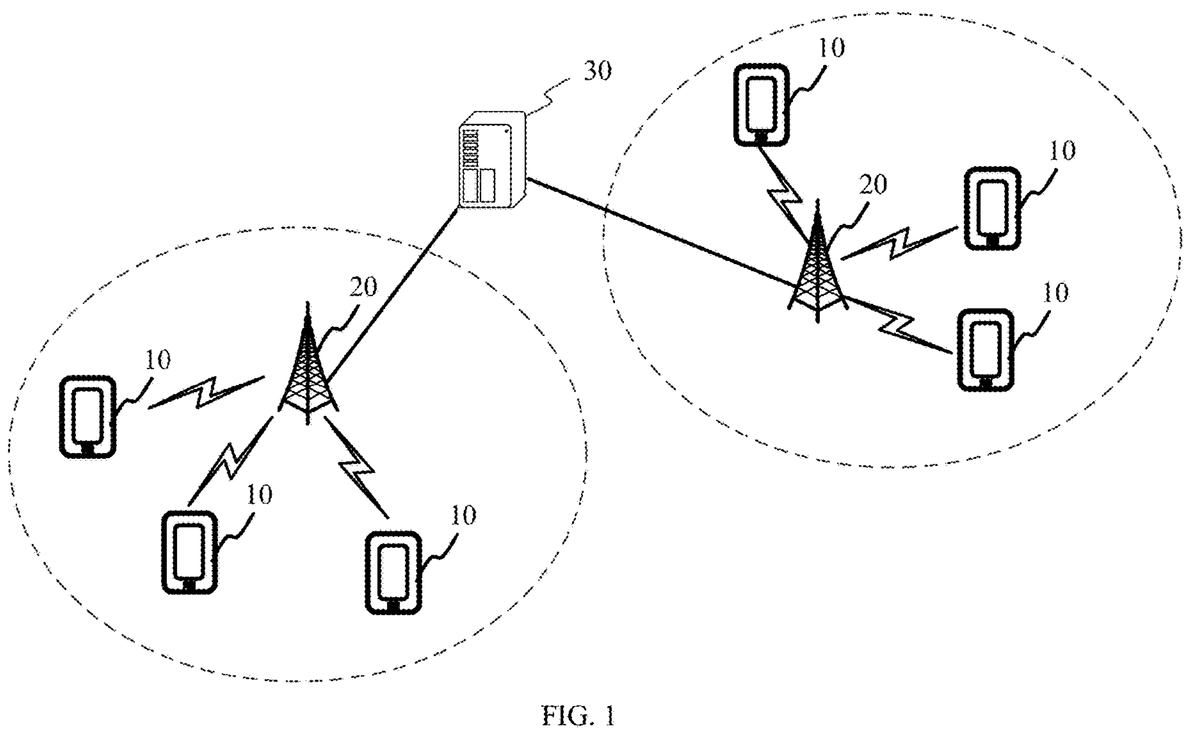
FIG. 1 is a schematic diagram of a network architecture of a communication system provided in an embodiment of the present disclosure.

Please refer to FIG. 1, which illustrates a schematic diagram of a network architecture of a communication system according to an embodiment of the present disclosure. The network architecture may include a terminal 10, a base station 20, and a core network 30.

There may be multiple terminals 10, and one or more terminals 10 may be distributed in a cell managed by each base station 20. The terminal 10 may include various handheld devices, vehicle-mounted devices, wearable devices, computing devices having a wireless communication function, or other processing devices connected to a wireless modem, and various forms of user equipment (UE), mobile station (MS), terminal device, and the like. For ease of description, in the embodiments of the present disclosure, the foregoing devices are generally referred to as terminals.

The base station 20 is an apparatus deployed in an access network to provide a terminal 10 with a wireless communication function. The base station 20 may include various forms of macro base stations, micro base stations, relay stations, access points, etc. In a system adopting different wireless access technologies, names of devices having a base station function may be different, for example, in a 5G New Radio (NR) system, it is referred to as a gNodeB or a gNB. With the evolution of communication technologies, the name "base station" may change. For ease of description, in embodiments of the present disclosure, the foregoing apparatus for providing a wireless communication function for the terminal 10 is generally referred to as base stations.

In embodiments of the present disclosure, the base station 20 may include at least two base stations, and the at least two base stations are respectively used for covering respective cells corresponding to the base stations.

A core network (CN) 30 is mainly used for providing user connection and user management, and bearing a service, and serves as a bearer network to provide an interface to an external network. Establishment of the user connection includes functions such as mobility management, call management, switching/routing, and voice recording notification (in conjunction with the intelligent network service, achieve the connection to the intelligent network peripheral devices).

Optionally, even not illustrated in FIG. 1, the network architecture further includes other network devices, such as a central network control node (CNC), a session management function (SMF), or a user plane function (UPF) device.

The "5G NR system" in embodiments of the present disclosure may also be referred to as a 5G system or an NR system, but the meaning thereof can be understood by those skilled in the art. The technical solutions described in the embodiments of the present disclosure may be applicable to a 5G NR system, and may also be applicable to a subsequent evolution system of the 5G NR system.

Figure 2:
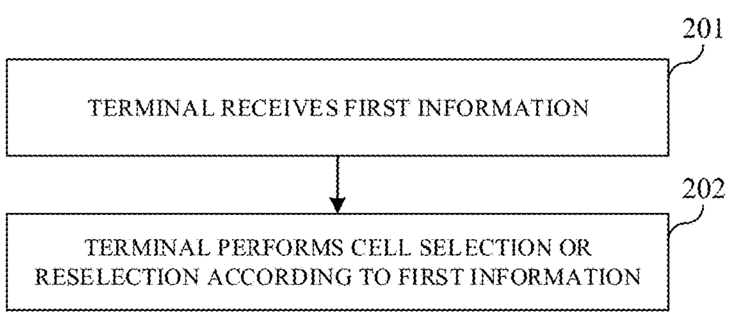
FIG. 2 illustrates a flowchart of a cell selection method provided in an embodiment of the present disclosure.

Please refer to FIG. 2, which illustrates a flowchart of a cell selection method provided in an embodiment of the present disclosure. The method may be executed by a terminal. The terminal may be the terminal 10 in the network architecture illustrated in FIG. 1. The method may include the following steps.

Step 201, the terminal obtains first information, where the first information is used for indicating that a second cell does not support an intended slice.

Step 202, the terminal performs cell selection or reselection according to the first information.

In conclusion, according to the solution illustrated in the embodiments of the present disclosure, when the second cell does not support the first intended slice, the terminal obtains first information for indicating that the second cell does not support the first intended slice, and performs cell selection or reselection according to the first information. In the solution, in the case where the second cell does not support the intended slice, according to the first information for indicating that the second cell does not support the first intended slice, the terminal performs cell selection or reselection, i. e. when the terminal performs cell selection or cell reselection, slice information supported by a cell is taken into consideration, thereby ensuring that the terminal can normally perform cell selection when the second cell does not support a slice, and avoiding loss of coverage.

With the above solution, when performing cell selection or resection, the terminal takes the slice information supported by a cell into consideration, which can ensure that the terminal can make normal cell selection when the second cell does not support a slice and avoid loss of coverage.

Figure 3:
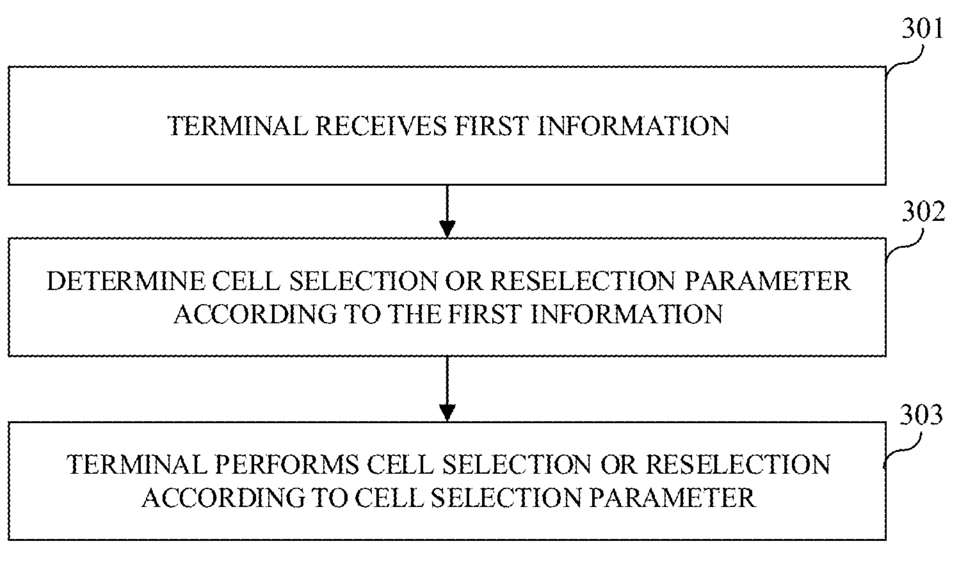
FIG. 3 illustrates a flowchart of a cell selection method provided in an embodiment of the present disclosure.

Please refer to FIG. 3, which illustrates a flowchart of a cell selection method provided in an embodiment of the present disclosure. The method may be executed by a terminal, a base station, and an AMF in a CN. The method may include the following steps.

Step 301, the terminal obtains first information.

In a possible implementation, the first information includes at least one of system information, dedicated information, information subscribed to by the terminal, and information stored at the terminal.

In a possible implementation, the terminal receives the first information sent by a second cell. Where the first information is used for indicating that the second cell does not support a first intended slice.

In a possible implementation, the first intended slice is an intended slice supported by a first cell.

In a possible implementation, the intended slice supported by the first cell is an intended slice obtained by the terminal (for example, obtained from a non-access stratum (NAS) of the terminal), and may also be a slice required when the terminal camps on the first cell.

In a possible implementation, the first cell is a cell currently selected or camped on by the terminal, and the second cell is different from the first cell.

Step 302, determine a cell selection or reselection parameter according to the first information.

The cell selection or reselection parameter includes, but is not limited to, at least one of the following: a channel quality comparison threshold, a cell bar access (CBA), a cell bar qualify (CBQ), a control channel maximum power level (MS_TXPWR_MAX_CCH), a minimum receive level to access (RXLEV_ACCESS_MIN), a cell reselection parameter indication, a cell reselection offset, a temporary offset, a penalty time, and a cell reselection hysteresis (CSH).

In a possible implementation, a first cell-selection or reselection parameter is determined as the cell selection or reselection parameter according to the first information; or a second cell-selection or reselection parameter is determined as the cell selection or reselection parameter according to the first information.

Namely, the terminal UE can obtain multiple sets of cell selection/reselection parameters, in which the second set of cell selection or reselection parameters (namely, the second cell-selection or reselection parameters) are used for ensuring that the UE camps on a source cell (that is, current cell) as far as possible when the source cell supports an intended slice but a neighboring cell does not support the intended slice (an intended slice corresponding to the first cell), thereby ensuring the slice continuity.

In a possible implementation, a first indication information is obtained according to the first information; when the first indication information satisfies a first indication condition, the first cell-selection or reselection parameter is determined as the cell selection or reselection parameter; and when the first indication information satisfies a second indication condition, the second cell-selection or reselection parameter is determined as the cell selection or reselection parameter.

The UE can obtain indication information. When the first indication information presents or is true (namely, satisfying the first indication condition), it represents that the UE is allowed to select the second set of parameters, and the UE is allowed to camp on the source cell as far as possible, so as to ensure slice continuity; when the first indication information does not present (namely, satisfying the second specified condition), it represents that the first set of parameters is to be selected by the UE, and a pre-defined cell selection or reselection parameter is used.

In a possible implementation, the second cell-selection or reselection parameter is obtained by the terminal from the first cell; or the second cell-selection or reselection parameter is obtained by the terminal from the second cell; or the second cell-selection or reselection parameter is pre-stored or predefined by the terminal.

In a possible implementation, the first indication information is obtained by the terminal from the first cell; or the first indication information is obtained by the terminal from the second cell; or the first indication information is pre-stored or predefined by the terminal.

That is, the second cell-selection or reselection parameter or the first indication information may be obtained by the UE from a source cell (system information) or a neighboring cell (system information), may also be previously stored at the terminal, and may also be predefined in a protocol.

Step 303, the terminal performs cell selection or reselection according to the cell selection or reselection parameter.

In a possible implementation, the terminal may use the second set of cell selection or reselection parameters to ensure that the UE stays in the first cell for a longer time, that is, camps on the second cell as late as possible.

In a possible implementation, the second cell-selection or reselection parameter includes a second threshold; the first cell-selection or reselection parameter includes a first threshold; and when a channel quality of the terminal corresponding to the first cell is not lower than the first threshold and not higher than the second threshold, the terminal camps on the first cell.

Based on the second set of cell selection/reselection parameters, if the channel quality of the UE in the source cell is lower than the first threshold (existing parameters) and higher than the second threshold (second set of parameters), the UE camps on the source cell and does not perform cell selection or reselection.

In a possible implementation, the second cell-selection or reselection parameter further includes a third threshold; and when the channel quality of the terminal corresponding to the second cell is not higher than the third threshold, the terminal camps on the first cell.

Based on the second set of cell selection/reselection parameters, if the channel quality of the UE in the neighboring cell is not higher than the third threshold (the second set of parameters, the third threshold is higher than the threshold of the existing parameters), the UE camps on the source cell and does not perform cell selection or reselection.

In a possible implementation, if the UE adopts the second cell-selection or reselection parameter, and the UE does not satisfy the described channel quality condition, when the terminal performs cell selection or reselection, the terminal can evaluate the first cell and the second cell directly according to the second cell-selection or reselection parameter.

In a possible implementation, the terminal performs a first operation, where the first operation includes at least one of: changing the first intended slice; executing a limited service or limited transmission; executing a normal service or normal transmission; camping on the second cell; performing cell selection or reselection; selecting or reselecting to the second cell; considering the second cell as an acceptable cell; considering the second cell as a suitable cell; falling back to a non-slice based cell selection or reselection rule; ignoring a slice-based cell selection or reselection rule; performing non-slice based cell selection or reselection; performing slice-based cell selection or reselection; or camping on the first cell.

When the terminal receives the first message and the first message indicates that the second cell does not support the first intended slice, the terminal may adopt a corresponding first operation, so as to ensure normal communication transmission between the terminal and the cell.

In a possible implementation, an access stratum of the terminal sends a first slice-indication message to a non-access stratum, where the first slice-indication message is used for indicating that the second cell does not support the first intended slice.

In a possible implementation, the access stratum of the terminal sends a second slice-indication message to the non-access stratum, where the second slice-indication message is used for indicating slice information supported by the second cell.

In a possible implementation of the embodiments of the present disclosure, the non-access stratum may be a non-access stratum of the terminal, or the non-access stratum may be a non-access stratum of a network-side device.

In a possible implementation, slice information may be a slice identifier, a slice group identifier, or a parameter (such as an access level) corresponding to a slice.

When the access stratum of the terminal obtains the first message and the first message indicates that the second cell does not support the first intended slice, the first slice-indication message may be sent to the non-access stratum to notify the non-access stratum that the second cell does not support the first intended slice. Alternatively, when the access stratum of the terminal receives the first message and the first message indicates the slice information supported by the second cell, the access stratum of the terminal may send the second slice-indication message to the non-access stratum to notify the non-access stratum of the information of the slice supported by the second cell.

In a possible implementation, the non-access stratum sends first feedback information for the slice requirement message to the terminal or the access stratum of the terminal; the slice requirement message includes at least one of the first slice-indication message and the second slice-indication message.

The terminal or the access stratum of the terminal performs one of the following operations according to the first feedback information for the slice requirement message: performing cell selection or reselection; determining an access behavior at the second cell; determining procedures of cell selection or reselection; or camping on the first cell.

The determining an access behavior at the second cell includes: determining whether the terminal or the access stratum of the terminal camps on the second cell, determining whether the terminal or the access stratum of the terminal considers the second cell as an appropriate cell, etc.; determining procedures of cell selection or reselection is that the terminal determines how to perform cell selection or reselection (for example, whether to perform according to an existing rule).

When receiving the slice requirement message, the non-access stratum may send first feedback information for the slice requirement message to the terminal or the access stratum of the terminal, so as to instruct the access stratum of the terminal or the terminal to execute a corresponding operation.

For example, when the non-access stratum receives the slice requirement message, the non-access stratum may instruct, through the first feedback information, the terminal to perform cell selection or reselection; or when the non-access stratum receives the slice requirement message, the non-access stratum may indicate, through the first feedback information, an access behavior of the terminal in the second cell (e. g. whether to camp on, whether to consider the second cell as a suitable cell, etc.). Alternatively, when the non-access stratum receives the slice requirement message, the non-access stratum may instruct, through the first feedback information, the terminal to camp on the first cell.

In a possible implementation, according to the first feedback information for the slice requirement message, an action executed by the terminal or the access stratum of the terminal includes at least one of the following: determining or executing a limited service or limited transmission; determining or executing a normal service or a normal transmission; determining or camping on the second cell; determining or selecting or reselecting to the second cell; determining or considering the second cell as an acceptable cell; determining or considering the second cell as a suitable cell; determining or performing a cell selection or reselection operation; determining or performing a non-slice based cell selection or reselection rule.

In a possible implementation, the first feedback information for the slice requirement message includes or is used for indicating at least one of: an intended-slice update indication; updating the first intended slice; executing a limited service or a limited transmission; executing a normal service or a normal transmission; camping on the second cell; performing cell selection or reselection; selecting or reselecting to a second cell; considering the second cell as an acceptable cell; considering the second cell as a suitable cell; or camping on the first cell.

After receiving the first feedback information for the slice requirement message, the terminal or the access stratum of the terminal may determine, according to the first feedback information for the slice requirement message, to perform a specified operation. Alternatively, when the first feedback information for the slice requirement message is used for instructing the access stratum of the terminal or the terminal to perform an operation corresponding to the feedback information, the access stratum of the terminal or the terminal performs a specified operation under the instruction of the non-access stratum.

For example, when the first feedback information for the slice requirement message sent by the non-access stratum to the terminal or the non-access stratum of the terminal includes "considering the second cell as a suitable cell", the access stratum of the terminal or the terminal receives the information of "considering the second cell as a suitable cell", and the access stratum of the terminal or the terminal determines that the access stratum of the terminal or the terminal is to perform an operation of camping on the second cell. When the first feedback information for the slice requirement message sent by the non-access stratum to the terminal or the non-access stratum of the terminal includes the indication information of "camping on the second cell", the access stratum of the terminal or the terminal directly performs an operation of camping on the second cell according to the indication information.

In a possible implementation, the non-access stratum performs at least one of the following operations according to the slice requirement message: updating the first intended slice, or determining a behavior of the access stratum of the terminal.

After the non-access stratum receives the slice requirement message, when the slice requirement message is used for indicating slice information supported by the second cell, the non-access stratum may update the slice according to the slice requirement message, and determine the behavior of the access stratum of the terminal. For example, the terminal may perform updated slice-based cell selection or reselection according to the updated slice.

After the non-access stratum receives the slice requirement message, when the slice requirement message indicates that the second cell does not support slice information, the non-access stratum may determine the behavior of the access stratum of the terminal.

In a possible implementation, determining the behavior of the access stratum of the terminal includes at least one of the following: determining or instructing the terminal or the access stratum of the terminal to execute a limited service or limited transmission; determining or instructing the terminal or the access stratum of the terminal to execute a normal service or a normal transmission; determining or instructing the terminal or the access stratum of the terminal to camp on the second cell; determining or instructing the terminal or the access stratum of the terminal to select or reselect to the second cell; determining or instructing the terminal or the access stratum of the terminal to consider the second cell as an acceptable cell; determining or instructing the terminal or the access stratum of the terminal to consider the second cell as a suitable cell; determining or instructing the terminal or the access stratum of the terminal to perform cell selection or reselection; or determining or instructing the terminal or an access stratum of the terminal to perform non-slice based cell selection or reselection rule.

For example, the behavior of the access stratum of the terminal may be as follows: when the access stratum of the terminal considers that the second cell is an acceptable cell, the access stratum of the terminal camps on the second cell; the access stratum of the terminal executes a limited service or limited transmission; or the access stratum of the terminal performs cell selection or reselection.

The access stratum of the terminal may perform an operation corresponding to the non-access stratum according to an instruction of the non-access stratum.

In a possible implementation, the non-access stratum sends the intended-slice update indication and/or the updated first slice to the terminal or the access stratum of the terminal.

The terminal or the access stratum of the terminal performs cell selection or reselection according to the intended-slice update indication and/or the updated first slice.

After obtaining the slice information supported by the second cell, the non-access stratum may update the slice according to the slice information supported by the second cell, or send a slice update indication to the access stratum, so as to instruct the access stratum to update the slice. After the slice is updated, the terminal or the access stratum of the terminal may perform slice-based cell selection or reselection according to the updated slice.

In a possible implementation, the first operation includes at least one of the following: the non-access stratum instructs the access stratum of the terminal to execute a limited service or limited transmission; the non-access stratum instructs the access stratum of the terminal to perform a normal service or a normal transmission; or the non-access stratum instructs the access stratum of the terminal to camp on the second cell.

That is, the access stratum of the terminal may execute a limited service or limited transmission under the instruction of the non-access stratum; or the access stratum of the terminal may execute a normal service or normal transmission under the instruction of the non-access stratum; or the access stratum may camp on the second cell under the instruction of the non-access stratum.

In a possible implementation, the non-access stratum sends a special instruction to the access stratum of the terminal, and the access stratum of the terminal performs one of the following operations according to the special instruction: cell selection or reselection; selecting or reselecting to the second cell; camping on the first cell; performing non-slice based cell selection or reselection.

The access stratum of the terminal may receive the special instruction sent by the non-access stratum, and perform at least one of the following according to the special instruction: performing cell selection or reselection, selecting or reselecting to the second cell, camping on the first cell, performing non-slice based cell selection or reselection.

For example, the special instruction may be NULL, and after receiving the special instruction sent by the non-access stratum, the access stratum of the terminal performs at least one of the following according to the special instruction: cell selection or reselection; selecting or reselecting to the second cell; camping on the first cell; performing non-slice based cell selection or reselection.

In a possible implementation, the terminal or the access stratum of the terminal executes at least one of the following actions according to first feedback information of the slice requirement message: executing a limited service or a limited transmission; executing a normal service or a normal transmission; camping on the second cell; selecting or reselecting to the second cell; considering the second cell as an acceptable cell; considering the second cell as a suitable cell; performing cell selection or reselection; or performing non-slice based cell selection or reselection.

When the terminal or the access stratum of the terminal receives the first feedback information for the slice requirement message, the terminal or the access stratum of the terminal may execute an operation corresponding to the feedback information.

In a possible implementation, the access stratum of the terminal performs cell selection or reselection when the channel quality of the terminal satisfies a first condition.

In a possible implementation, when a frequency priority of the first cell is lower than a frequency priority of the second cell, the channel quality of the terminal corresponding to the first cell is lower than a quality threshold; when the frequency priority of the first cell is not lower than the frequency priority of the second cell, the channel quality of the terminal corresponding to the first cell is less than the quality threshold, and the channel quality of the terminal corresponding to the second cell is greater than the quality threshold.

In the described solution, when the terminal or the access stratum of the terminal obtains the first message corresponding to the second cell, and the first message indicates that the second cell does not support an intended slice corresponding to the first cell, the slice requirement message may be sent to the non-access stratum, and after the non-access stratum receives the slice requirement message, the non-access stratum sends first feedback information corresponding to the slice requirement message, to instruct the access stratum to complete all or some of the steps of cell selection or reselection.

When the non-access stratum instructs, through the first feedback information, the terminal or the access stratum of the terminal to complete all the steps of cell selection, the terminal or the access stratum of the terminal completes all the steps of cell selection according to the first feedback information. When the non-access stratum instructs, through the first feedback information, the terminal or the access stratum of the terminal to complete some steps of cell selection, the access stratum of the terminal or the terminal may complete some steps of cell selection according to the first feedback information, and then determine and execute subsequent steps of cell selection.

In a possible implementation, the first operation includes at least one of the following: camping on the second cell; executing a limited service or a limited transmission; executing a normal service or a normal transmission; considering the second cell as a suitable cell; considering the second cell as an acceptable cell; performing cell selection or reselection; retaining a slice-based cell selection or reselection rule; performing slice-based cell selection or reselection; selecting or reselecting to the second cell; or camping on the first cell.

In a possible implementation, the first operation includes at least one of the following: the terminal camps on the second cell; the terminal executes a limited service or a limited transmission; the terminal executes a normal service or a normal transmission; the terminal performs cell selection or reselection; the terminal considers the second cell as a suitable cell; the terminal considers the second cell as an acceptable cell; the terminal performs slice-based cell selection or reselection; the terminal selects or reselects to the second cell; the terminal camps on the first cell.

In a further possible implementation, the first operation includes at least one of the following: the access stratum of the terminal instructs the terminal to camp on the second cell; the access stratum of the terminal instructs the terminal to execute a limited service or limited transmission; the access stratum of the terminal instructs the terminal to execute a normal service or normal transmission; the access stratum of the terminal instructs the terminal to perform cell selection or reselection; the access stratum of the terminal instructs the terminal to select or reselect to the second cell; or the access stratum of the terminal instructs the terminal to camp on the first cell.

That is, the first operation may also be performed by the terminal or the access stratum of the terminal under the instruction of the access stratum of the terminal.

In a possible implementation, the access stratum of the terminal performs cell selection or reselection when the channel quality of the terminal satisfies a second condition.

In a possible implementation, when the frequency priority of the first cell is lower than the frequency priority of the second cell, the channel quality of the terminal corresponding to the first cell is lower than the quality threshold; when the frequency priority of the first cell is not lower than the frequency priority of the second cell, the channel quality of the terminal corresponding to the first cell is lower than the quality threshold, and the channel quality of the terminal corresponding to the second cell is greater than the quality threshold.

In the foregoing solution, the terminal or the access stratum of the terminal may send the slice requirement message to the non-access stratum; alternatively, the terminal or the access stratum of the terminal may also not send the slice requirement message to the non-access stratum.

Regardless of whether the terminal or the access stratum of the terminal sends the slice requirement message to the non-access stratum, the access stratum of the terminal may instruct the terminal or the access stratum of the terminal to perform all operations of cell selection, that is, in the foregoing solution, the non-access stratum of the terminal or the terminal performs steps of cell selection under the instruction of the access stratum of the terminal.

In a possible implementation, the first operation includes at least one of the following: camping on the second cell; executing a limited service or a limited transmission; executing a normal service or a normal transmission; considering the second cell as a suitable cell; considering the second cell as an acceptable cell; performing cell selection or reselection; performing non-slice based cell selection or reselection; selecting or reselecting to the second cell; ignoring a slice-based cell selection or reselection rule; falling back to a non-slice cell selection or reselection rule; or camping on the first cell.

In a possible implementation, the first operation includes at least one of the following: the access stratum of the terminal instructs the terminal to camp on the second cell; the access stratum of the terminal instructs the terminal to execute a limited service or limited transmission; the access stratum of the terminal instructs the terminal to execute a normal service or normal transmission; the access stratum of the terminal instructs the terminal to execute cell selection or reselection; the access stratum of the terminal instructs the terminal to select or reselect to the second cell; or the access stratum of the terminal instructs the terminal to camp on the first cell.

That is, the first operation may also be performed the terminal or the access stratum of the terminal under the instruction of the access stratum of the terminal.

In a possible implementation, when the channel quality of the terminal satisfies a third condition, the terminal performs cell selection or reselection.

In a possible implementation, when the frequency priority of the first cell is lower than the frequency priority of the second cell, the channel quality of the terminal corresponding to the first cell is lower than the quality threshold; when the frequency priority of the first cell is not lower than the frequency priority of the second cell, the channel quality of the terminal corresponding to the first cell is lower than the quality threshold, and the channel quality of the terminal corresponding to the second cell is greater than the quality threshold.

In the foregoing solution, the terminal or the access stratum of the terminal obtains a first message corresponding to the second cell, and the first message indicates that the second cell does not support the intended slice corresponding to the first cell, and the slice requirement message can be sent to the non-access stratum; alternatively, the terminal or the access stratum of the terminal may also not send the slice requirement message to the non-access stratum.

Regardless of whether the terminal or the access stratum of the terminal sends the slice requirement message to the non-access stratum, the access stratum of the terminal may instruct the terminal or the access stratum of the terminal to perform all operations of cell selection, that is, in the foregoing solution, the non-access stratum of the terminal or the terminal performs steps of cell selection under the instruction of the access stratum of the terminal.

In a possible implementation, the access stratum of the terminal stores a slice record, where the slice record is used for indicating that the second cell does not support the first intended slice; when the access stratum of the terminal determines that the second cell supports the first intended slice, the access stratum of the terminal sends a slice recovery message to the non-access stratum; the slice recovery message is used for indicating that the second cell supports the first intended slice; and the access stratum of the terminal executes a normal service or performs normal transmission.

In a possible implementation, the non-access stratum sends second feedback information to the access stratum of the terminal; when the access stratum of the terminal receives the second feedback information, the access stratum of the terminal executes a normal service or a normal transmission.

After receiving the slice recovery message, the access stratum notifies the non-access stratum that the second cell supports the first intended slice; after receiving the notification, the non-access stratum sends second feedback information to the access stratum of the terminal; and after receiving the second feedback information, the access stratum of the terminal instructs the access stratum of the terminal to enter a normal service or normal transmission.

In a possible implementation, when the access stratum of the terminal determines that the second cell supports the first intended slice, the access stratum of the terminal or the terminal performs slice-based cell selection or reselection.

After the access stratum of the terminal determines that the second cell supports the first intended slice, the access stratum of the terminal or the terminal may perform slice-based cell selection or reselection again.

In a possible implementation, the access stratum of the terminal or the terminal determines, according to the second information, whether to perform the first operation.

In a possible implementation, the second information is from the network device or the second information is predefined.

When the terminal or the access stratum of the terminal receives the second information, the terminal or the access stratum of the terminal determines to execute the first operation; and when the terminal or the access stratum of the terminal does not receive the second information, the terminal or the access stratum of the terminal performs cell selection according to an existing cell selection or reselection rule.

In conclusion, according to the solution provided in the embodiments of the present disclosure, when the second cell does not support the first intended slice, the terminal obtains first information for indicating that the second cell does not support the first intended slice, and performs cell selection or reselection according to the first information. In the solution, in the case where the second cell does not support an intended slice, according to first information for indicating that the second cell does not support the first intended slice, the terminal performs cell selection or reselection, i. e. when the terminal performs cell selection or cell reselection, slice information supported by a cell is taken into consideration, thereby ensuring that the terminal can normally perform cell selection when the second cell does not support a slice, and avoiding loss of coverage.

Figure 4:
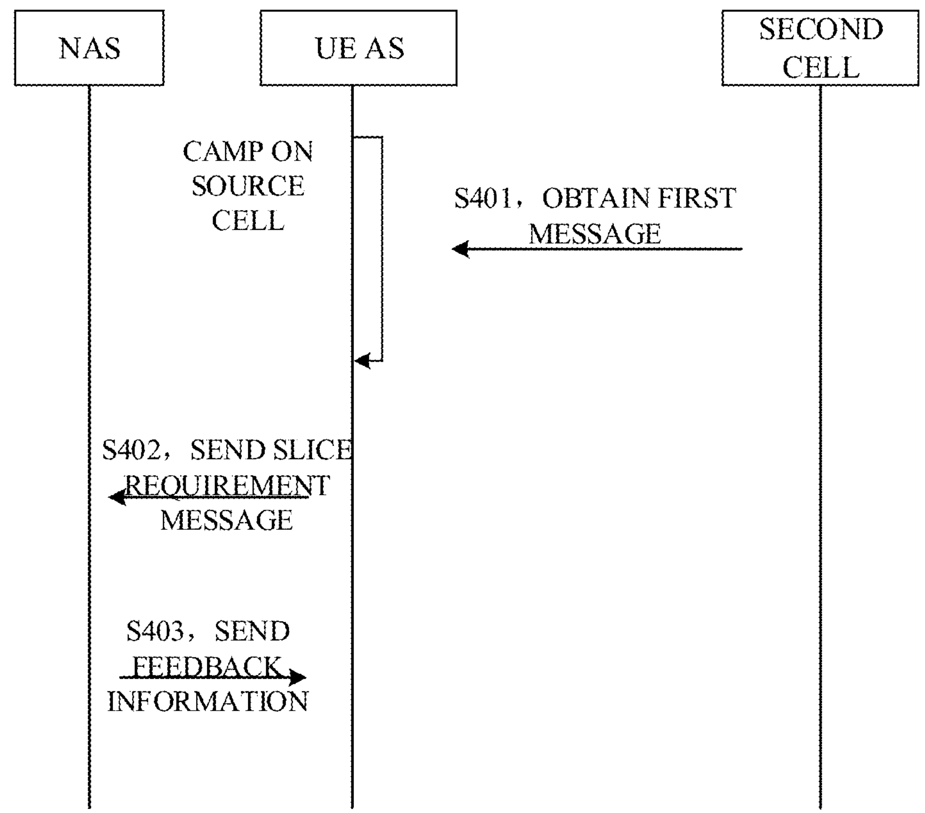
FIG. 4 illustrates a schematic flowchart of a cell selection method provided in an exemplary embodiment of the present disclosure.

Please refer to FIG. 4, which illustrates a schematic flowchart of a cell selection method provided by an exemplary embodiment of the present disclosure. As illustrated in FIG. 4, the cell selection method includes the following steps.

S401, an access stratum of a UE obtains a first message.

In this case, the UE camps on the source cell (namely, the first cell). The UE may camp on the first cell after obtaining the first message; the UE may also camp on the first cell while obtaining the first message; or the UE may also obtain the first message after camping on the first cell.

The first message is used for indicating that the second cell does not support an intended slice of the first cell (namely, the source cell).

S402, the access stratum of the UE sends a slice requirement message to a non-access stratum.

The slice requirement message includes at least one of a first slice-indication message and a second slice-indication message. The first slice-indication message is used for indicating that the second cell does not support an intended slice. The second slice-indication message is used for indicating slice information supported by the second cell.

S403, the non-access stratum sends feedback information to the access stratum of the UE, so as to instruct the access stratum of the UE to execute a first operation.

In embodiments of the present disclosure, when the terminal or the access stratum of the terminal obtains the first message corresponding to the second cell, and the first message indicates that the second cell does not support the intended slice corresponding to the first cell, the slice requirement message can be sent to the non-access stratum; and after receiving the slice requirement message, the non-access stratum sends first feedback information corresponding to the slice requirement message.

When the non-access stratum instructs, through first feedback information, the terminal or the access stratum of the terminal to complete all the steps of cell selection, the terminal or the access stratum of the terminal completes all the steps of cell selection according to the first feedback information. When the non-access stratum instructs, through the first feedback information, the terminal or the access stratum of the terminal to complete some steps of cell selection, the access stratum of the terminal or the terminal may complete some steps of cell selection according to the first feedback information, and then determine and execute subsequent steps of cell selection.

For example, the solution of the embodiments of the present disclosure can further include the following steps:

The UE access stratum (AS) indicates to the UE non-access stratum (NAS) that an intended slice is not available.

The UE AS executes a corresponding behavior under the instruction of the NAS, and specifically, the NAS instruction or the AS behavior is one of the following: changing an intended slice, and entering a limited service (limited service or limited transmission), i. e. entering a normal service (normal service or normal transmission), and indicating NULL (representing using a 15/16 cell selection/reselection mechanism, i. e. non-slice based cell selection or reselection).

For example, the UE AS indicates to the UE NAS a slice supported by a neighboring cell, that is, an available slice (a slice supported by the second cell), and the UE NAS updates an intended slice and notifies the UE AS. The UE AS performs cell selection/reselection (slice based cell selection or reselection) based on the updated intended slice.

Alternatively, the UE AS indicates to the UE NAS that the neighboring cell does not support the intended slice, and the UE NAS instructs the UE AS to enter the limited service or camp on (namely, enter the normal service). The UE AS executes corresponding operations.

Alternatively, the UE AS indicates to the UE NAS that the neighboring cell does not support the intended slice, the UE NAS instructs the UE AS with a NULL instruction, and the UE AS executes an existing cell selection/reselection rule (non-slice based cell selection or reselection).

Further, the UE AS may notify the UE NAS the available slices.

Further, the UE AS may also indicate to the UE NAS requirement or the UE AS behavior, such as at least one of the following: requesting to change an intended slice, the UE AS entering a limited service, camping on a neighboring cell (namely, entering a normal service), and executing an existing cell selection/reselection rule (namely, a non-slice based cell selection or reselection rule).

Further, the UE AS reserves a record (the intended slice is not available), and when the intended slice is available, notifies the UE NAS. At this time, the UE AS starts to obtain the normal service, or starts to obtain the normal service after the UE NAS feeds back.

Further, the UE performs first cell selection/reselection on a condition that the channel quality satisfies a first condition. The first condition includes the following.

i. The source cell is lower than a threshold (the frequency priority of the source cell is low).

ii. The source cell is lower than the threshold, and the neighboring cell is higher than the threshold (the priority is equal, or the frequency priority of the source cell is higher).

Figure 5:
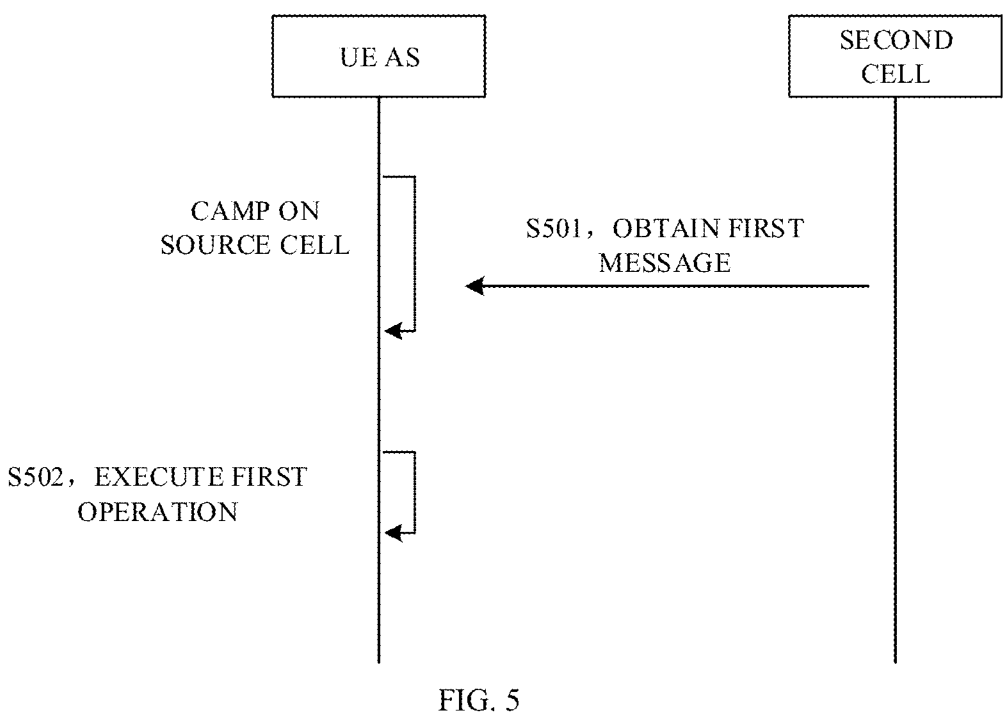
FIG. 5 illustrates a schematic flowchart of a cell selection method provided in an exemplary embodiment of the present disclosure.

Please refer to FIG. 5, which illustrates a schematic flowchart of a cell selection method according to an exemplary embodiment of the present disclosure. As illustrated in FIG. 5, the cell selection method includes the following steps.

S501, an access stratum of a UE obtains a first message.

In this case, the UE camps on the source cell (namely, the first cell), and the UE may camp on the first cell after obtaining the first message; the UE may also camp on the first cell while obtaining the first message; or the UE may also obtain the first message after camping on the first cell.

S502, the access stratum of the UE executes a first operation.

In embodiments of the present disclosure, the terminal or the access stratum of the terminal may send the slice requirement message to the non-access stratum; alternatively, the terminal or the access stratum of the terminal may also not send the slice requirement message to the non-access stratum.

Regardless of whether the terminal or the access stratum of the terminal sends the slice requirement message to the non-access stratum, the access stratum of the terminal may instruct the terminal or the access stratum of the terminal to perform all operations of cell selection, that is, in the foregoing solution, the non-access stratum of the terminal or the terminal performs cell selection steps with the instruction of the access stratum of the terminal.

For example, the solution according to the embodiments of the present disclosure can further include the following steps.

When the source cell supports the intended slice of the UE but the neighboring cell does not support the intended slice of the UE, the UE executes at least one of the following actions: camping on the neighboring cell, obtaining a limited service, or considering the neighboring cell as at least one of the acceptable cells.

Further, the UE AS indicates to the UE NAS that the intended slice is unavailable.

Further, the UE AS may notify the UE NAS of the available slices.

Further, the UE AS may also indicate a behavior of the UE AS, such as at least one of the following: camping on a neighboring cell, or obtaining a limited service.

Further, the UE AS reserves a record (an intended slice is not available), and when the intended slice is available, notifies the UE NAS. At this time, the UE AS starts to obtain the normal service, or starts to obtain the normal service after the UE NAS feeds back.

Further, the UE executes the first cell selection/reselection when the channel quality satisfies a second condition. The second condition includes the following.

i. The source cell is lower than a threshold (the frequency priority of the source cell is low).

ii. The source cell is lower than the threshold, and the neighboring cell is higher than the threshold (the priority is equal, or the frequency priority of the source cell is higher).

Figure 6:
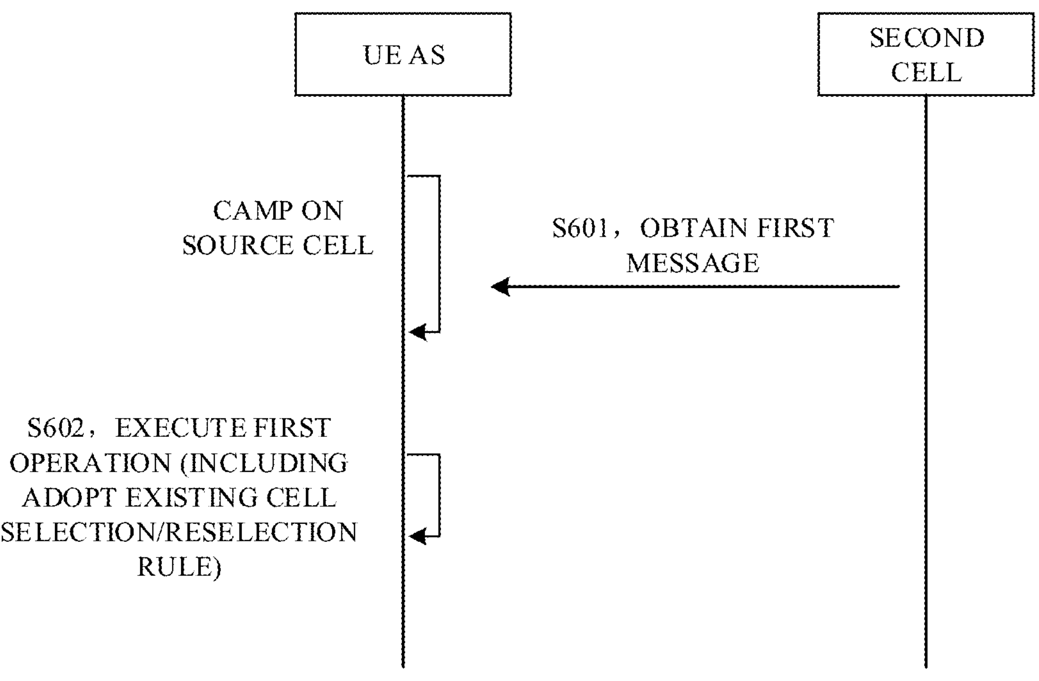
FIG. 6 is a flowchart of a cell selection method provided in an exemplary embodiment of the present disclosure.

FIG. 6 is a schematic flowchart of a cell selection method according to an exemplary embodiment of the present disclosure. As illustrated in FIG. 6, the cell selection method includes the following steps.

S601, an access stratum of a UE obtains a first message.

In this case, the UE camps on the source cell (namely, the first cell). The UE may camp on the first cell after obtaining the first message; the UE may also camp on the first cell while obtaining the first message; or the UE may also obtain the first message after camping on the first cell.

S602, the access stratum of the UE executes a first operation.

In embodiments of the present disclosure, the first operation includes non-slice based cell selection or reselection. That is, in embodiments of the present disclosure, the access stratum of the UE can directly select or fall back to the R15/R16 mechanism, so as to preferentially ensure that the UE will not lose coverage and service.

In embodiments of the present disclosure, the terminal or the access stratum of the terminal obtains the first message corresponding to a second cell, the first message indicates that the second cell does not support intended slice corresponding to the first cell, and a slice requirement message can be sent to a non-access stratum. Alternatively, the terminal or the access stratum of the terminal may also not send the slice requirement message to the non-access stratum.

Regardless of whether the terminal or the access stratum of the terminal sends the slice requirement message to the non-access stratum, the access stratum of the terminal may instruct the terminal or the access stratum of the terminal to perform all operations of cell selection, that is, in the foregoing solution, the non-access stratum of the terminal or the terminal performs cell selection steps with the instruction of the access stratum of the terminal.

For example, the solution according to embodiments of the present disclosure can further include the following steps: in the case that the source cell supports the intended slice of the UE but the neighboring cell does not support the intended slice of the UE, the UE executes at least one of the following actions: using an existing cell selection/reselection rule, camping on the neighboring cell, obtaining a normal service, or considering the neighboring cell as a suitable cell.

Further, the UE AS indicates to the UE NAS that the intended slice is unavailable.

Further, the UE AS may notify the UE NAS the available slices.

Further, the UE AS may also indicate a behavior of the UE AS, such as at least one of the following: camping on a neighboring cell, or obtaining a limited service.

Further, the UE AS reserves a record (an intended slice is unavailable), and when the intended slice is available, notifies the UE NAS. At this time, the UE AS starts to obtain the normal service, or starts to obtain the normal service after the UE NAS feeds back.

Further, the UE executes the first cell selection/reselection when the channel quality satisfies a third condition. The third condition includes the following.

i. The source cell is lower than a threshold (the frequency priority of the source cell is low).

ii. The source cell is lower than the threshold, and the neighboring cell is higher than the threshold (the priority is equal, or the frequency priority of the source cell is higher).

Figure 7:
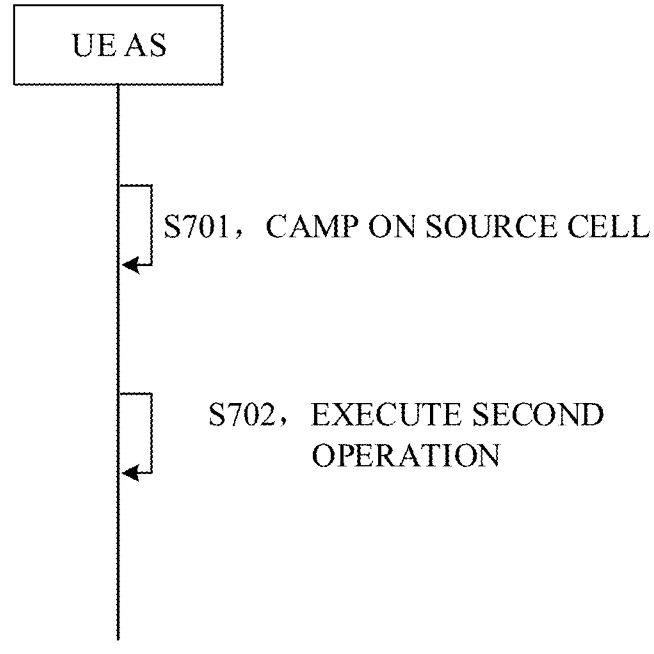
FIG. 7 illustrates a flowchart of a cell selection method provided in an exemplary embodiment of the present disclosure.

FIG. 7 illustrates a flowchart of a cell selection method according to an exemplary embodiment of the present disclosure. As illustrated in FIG. 7, the cell selection method includes the following steps.

S701, a UE camps on a source cell.

In a possible implementation, the UE obtains multiple sets of cell selection/reselection parameters, where one set (namely, a second set) is used for ensuring that the UE camps on the source cell as far as possible to ensure slice continuity when the source cell support the intended slice but a neighboring cell does not support the intended slice.

In a possible implementation, the UE obtains first indication information, if the first indication information presents or is true, it indicates that the UE is allowed to select the second set of parameters, or the UE is allowed to camp on the source cell as far as possible, thereby ensuring slice continuity.

In a possible implementation, the second set of parameters or the first indication information may be obtained by the UE from a local cell (system information) or a neighboring cell (system information), and may also be stored previously.

S702, the UE performs a second operation when the first cell supports the intended slice but the second cell does not support the intended slice.

The second operation includes at least one of the following actions: using the second set of cell selection/reselection parameters, so as to ensure that the UE stays in the source cell for a longer time, that is, the UE selects a neighboring cell to camp on as late as possible.

If based on the second set of cell selection/reselection parameters, the channel quality of the UE in the source cell is lower than a first threshold (existing parameters) but higher than a second threshold (second set of parameters), the UE will camp on the source cell and does not perform cell selection or reselection.

If based on the second set of cell selection/reselection parameters, the channel quality of the UE in the neighboring cell is not higher than a third threshold (the second set of parameters, the third threshold is higher than the threshold of the existing parameters), the UE will camp on the source cell and does not perform cell selection or reselection.

Otherwise (namely, not satisfying the above conditions), the UE executes subsequent operations according to one of the embodiments illustrated in FIGS. 4, 5 and 6.

It should be noted that, content or steps in the foregoing embodiments may be freely combined to implement the cell selection method involved in the present disclosure. In a practical application, content or steps in each embodiment may also be combined and implemented on a logical basis to implement technical effects described in each embodiment of the present disclosure.

The following describes apparatus embodiments of the present disclosure, which may be used to execute the method embodiment of the present disclosure. For details not disclosed in the apparatus embodiment of the present disclosure, refer to the method embodiment of the present disclosure.

Figure 8:
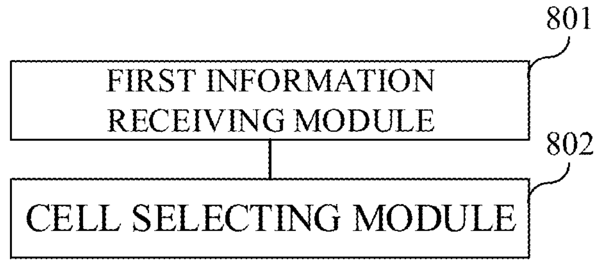
FIG. 8 illustrates a block diagram of a cell selection apparatus provided in an embodiment of the present disclosure.

Please refer to FIG. 8, which illustrates a block diagram of a cell selection apparatus provided by an embodiment of the present disclosure. The apparatus is applied to a terminal, and has a function of implementing the foregoing cell selection method. As illustrated in FIG. 8, the apparatus may include a first information receiving module 801 and a cell selecting module 802.

The first information receiving module 801 is configured for the terminal to obtain first information, where the first information is used for indicating that a second cell does not support a first intended slice.

The cell selecting module 802 is configured for the terminal to perform cell selection or reselection according to the first information.

In a possible implementation, the first cell is a cell currently selected or camped on by the terminal, and the second cell is different than the first cell.

In a possible implementation, the first information includes at least one of system information, dedicated information, information subscribed to by the terminal, or information stored in the terminal.

In a possible implementation, the cell selecting module 802 includes a selection-parameter determining sub-module and a cell selecting sub-module. The selection-parameter determining sub-module is configured to determine a cell selection or reselection parameter according to the first information; the cell selecting sub-module is configured for the terminal to perform cell selection or reselection according to the cell selection or reselection parameter.

In a possible implementation, the cell selecting sub-module further includes a first parameter obtaining unit or a second parameter obtaining unit.

The first parameter obtaining unit is configured to determine a first cell-selection or reselection parameter as the cell selection or reselection parameter according to the first information. The second parameter obtaining unit is configured to determine a second cell-selection or reselection parameter as the cell selection or reselection parameter according to the first information.

In a possible implementation, the apparatus further includes a first indication information obtaining module for obtaining a first indication information according to the first information.

The first parameter obtaining unit is further configured to determine the first cell-selection or reselection parameter as the cell selection or reselection parameter when the first indication information satisfies a first indication condition.

The second parameter obtaining unit is further configured to determine the second cell-selection or reselection parameter as the cell selection or reselection parameter when the first indication information satisfies a second indication condition.

In a possible implementation, the second cell-selection or reselection parameter is obtained by the terminal from the first cell; or the second cell-selection or reselection parameter is obtained by the terminal from the second cell; or the second cell-selection or reselection parameter is pre-stored or pre-defined by the terminal.

In a possible implementation, the first indication information is obtained by the terminal from the first cell; or the first indication information is obtained by the terminal from the second cell; or, the first indication information is pre-stored or pre-defined by the terminal.

In a possible implementation, the second cell-selection or reselection parameter includes a second threshold, and the first cell-selection or reselection parameter includes a first threshold. The apparatus further includes a first terminal camping module. The first terminal camping module is configured for the terminal to camp on the first cell when the channel quality of the terminal corresponding to the first cell is not lower the first threshold and the channel quality of the terminal corresponding to the first cell is not higher the second threshold.

In a possible implementation, the second cell-selection or reselection parameter further includes a third threshold, and the apparatus further includes: when the channel quality of the terminal corresponding to the second cell is not higher than the third threshold, the terminal camps on the first cell.

In a possible implementation, the apparatus further includes a first operation module. The first operation module is configured for the terminal to execute a first operation, where the first operation includes at least one of the following.

Replacing the first intended slice; executing a limited service or limited transmission; executing a normal service or normal transmission; camping on the second cell; performing cell selection or reselection; selecting or reselecting to the second cell; considering the second cell as an acceptable cell; considering the second cell as a suitable cell; falling back to a non-slice based cell selection or reselection rule; ignoring the slice-based cell selection or reselection rule; performing non-slice based cell selection or reselection; performing slice-based cell selection or reselection; or camping on the first cell.

In a possible implementation, the apparatus further includes at least one of: a first slice indication sending module, or a second slice indication sending module.

The first slice indication sending module is configured to instruct an access stratum of the terminal to send a first slice-indication message to a non-access stratum; the first slice-indication message is used for indicating that the second cell does not support the first intended slice.

The second slice indication sending module is configured to instruct an access stratum of the terminal to send a second slice-indication message to the non-access stratum; the second slice-indication message is used for indicating slice information supported by the second cell.

In a possible implementation, the cell selecting module 802 includes a first feedback information sending module and a first executing module.

The first feedback information sending module is configured to instruct the non-access stratum to send first feedback information for a slice requirement message to the terminal or the access stratum of the terminal; the slice requirement message includes at least one of the first slice-indication message or the second slice-indication message.

The first executing module, where the terminal or the access stratum of the terminal executes one of the following operations according to the first feedback information for the slice requirement message: performing cell selection or reselection; determining an access behavior in the second cell; determining procedures of cell selection or reselection; or camping on the first cell.

In a possible implementation, the first feedback information for the slice requirement message includes or is used for indicating at least one of: an intended-slice update indication; updating the first intended slice; executing a limited service or limited transmission; executing a normal service or normal transmission; camping on the second cell; performing cell selection or reselection; selecting or reselecting to a second cell; considering the second cell as an acceptable cell; considering the second cell as a suitable cell; or camping on the first cell.

In a possible implementation, the apparatus further includes a second executing module. The second executing module is configured to instruct the non-access stratum to execute at least one of the following operations according to the slice requirement message: updating the first intended slice, or determining a behavior of the access stratum of the terminal.

In a possible implementation, determining the behavior of the access stratum of the terminal includes at least one of the following: determining or instructing the terminal or the access stratum of the terminal to execute a limited service or a limited transmission; determining or instructing the terminal or the access stratum of the terminal to execute a normal service or a normal transmission; determining or instructing the terminal or the access stratum of the terminal to camp on the second cell; determining or instructing the terminal or the access stratum of the terminal to select or reselect to the second cell; determining or instructing the terminal or the access stratum of the terminal to consider the second cell as an acceptable cell; determining or instructing the terminal or the access stratum of the terminal to consider the second cell as a suitable cell; determining or instructing the terminal or the access stratum of the terminal to perform cell selection or reselection; determining or instructing the terminal or the access stratum of the terminal to execute a non-slice based cell selection or reselection rule.

In a possible implementation, the apparatus further includes an updated slice sending module and a slicing cell reselecting module.

The update slice sending module is configured to instruct the non-access stratum to send the intended-slice update indication and/or the updated first intended slice to the terminal or the access stratum of the terminal.

The slicing cell reselecting module is configured to instruct the terminal or the access stratum of the terminal to perform cell selection or reselection according to the intended-slice update indication and/or the updated first intended slice.

In a possible implementation, executing a limited service or limited transmission includes: instructing, by the non-access stratum, the access stratum of the terminal to execute a limited service or limited transmission.

Executing a normal service or a normal transmission includes: instructing, by the non-access stratum, the access stratum of the terminal to execute a normal service or a normal transmission.

Camping on the second cell includes: instructing, by the non-access stratum, the access stratum of the terminal to camp on the second cell.

In a possible implementation, the first executing module includes a special instruction sending sub-module and a third operation executing sub-module.

The special instruction sending sub-module is configured to instruct the non-access stratum to send a special instruction to the access stratum of the terminal.

The third operation executing sub-module is configured to instruct the access stratum of the terminal to execute one of the following operations according to the special instruction: cell selection or reselection; selecting or reselecting to the second cell; camping on the first cell; or performing non-slice based cell selection or reselection.

In a possible implementation, the apparatus further includes a fourth operation module.

The fourth operation module is configured to instruct the terminal or the access stratum of the terminal to perform at least one of the following actions according to the first feedback information of the slice requirement message: executing a limited service or limited transmission; executing normal service or normal transmission; camping on the second cell; selecting or reselecting to the second cell; considering the second cell as an acceptable cell; considering the second cell as a suitable cell; performing cell selection or reselection; performing non-slice based cell selection or reselection.

In a possible implementation, the cell selecting module 802 is further configured for the access stratum of the terminal to perform cell selection or reselection, when the channel quality of the terminal satisfies a first condition.

In a possible implementation, the first condition includes: when the frequency priority of the first cell is lower than the frequency priority of the second cell, the channel quality of the terminal corresponding to the first cell is less than a quality threshold; when the frequency priority of the first cell is not lower than the frequency priority of the second cell, the channel quality of the terminal corresponding to the first cell is less than the quality threshold, and the channel quality of the terminal corresponding to the second cell is greater than the quality threshold.

In a possible implementation, the first operation includes at least one of the following: camping on the second cell; executing a limited service or limited transmission; executing normal service or normal transmission; considering the second cell as a suitable cell; considering the second cell as an acceptable cell; performing cell selection or reselection; retaining a slice-based cell selection or reselection rule; performing slice-based cell selection or reselection; selecting or reselecting to the second cell; or camping on the first cell.

In a possible implementation, the terminal camping on the second cell includes: the access stratum of the terminal instructs the terminal to camp on the second cell. The terminal executing a limited service or limited transmission includes: the access stratum of the terminal instructs the terminal to execute a limited service or limited transmission.

The terminal executing a normal service or normal transmission includes: the access stratum of the terminal instructs the terminal to execute a normal service or normal transmission.

Performing cell selection or reselection further includes: the access stratum of the terminal instructs the terminal to perform cell selection or reselection.

Selecting or reselecting to the second cell further includes: the access stratum of the terminal instructs the terminal to select or reselect to the second cell.

Camping on the first cell further includes: the access stratum of the terminal instructs the terminal to camp on the first cell.

In a possible implementation, the cell selecting module 802 is further configured for the access stratum of the terminal to execute the cell selection or reselection, when the channel quality of the terminal satisfies a second condition.

In a possible implementation, the second condition includes: when the frequency priority of the first cell is lower than the frequency priority of the second cell, the channel quality of the terminal corresponding to the first cell is less than a quality threshold; when the frequency priority of the first cell is not lower than the frequency priority of the second cell, the channel quality of the terminal corresponding to the first cell is less than the quality threshold, and the channel quality of the terminal corresponding to the second cell is greater than the quality threshold.

In a possible implementation, the first operation includes at least one of the following operations: camping on the second cell; executing a limited service or limited transmission; executing a normal service or normal transmission; considering the second cell as a suitable cell; considering the second cell as an acceptable cell; performing cell selection or reselection; performing non-slice based cell selection or reselection; selecting or reselecting to the second cell; ignoring a slice-based cell selection or reselection rule; falling back to a non-slice cell selection or reselection rule; camping on the first cell.

In a possible implementation, the terminal camping on the second cell includes: the access stratum of the terminal instructs the terminal to camp on the second cell.

The terminal executing a limited service or limited transmission includes: the access stratum of the terminal instructs the terminal to execute a limited service or limited transmission.

The terminal executing a normal service or normal transmission includes: the access stratum of the terminal instructs the terminal to execute a limited service or limited transmission Performing cell selection or reselection includes: the access stratum of the terminal instructs the terminal to perform cell selection or reselection.

Selecting or reselecting to the second cell includes: the access stratum of the terminal instructs the terminal to select or reselect to the second cell.

Camping on the first cell includes: the access stratum of the terminal instructs the terminal to camp on the first cell.

In a possible implementation, the cell selecting module 802 is further configured for the terminal to execute cell selection or reselection when the channel quality of the terminal satisfies a third condition.

In a possible implementation, the third condition includes: when the frequency priority of the first cell is lower than the frequency priority of the second cell, the channel quality of the terminal corresponding to the first cell is less than a quality threshold; when the frequency priority of the first cell is not lower than the frequency priority of the second cell, the channel quality of the terminal corresponding to the first cell is less than the quality threshold, and the channel quality of the terminal corresponding to the second cell is greater than the quality threshold.

In a possible implementation, the apparatus further includes at least one of a slice record storage module, a slice recovery message sending module, or a normal service module.

The slice record storage module is configured to instruct the access stratum of the terminal to store a slice record, where the slice record is used for indicating that the second cell does not support the first intended slice.

The slice recovery message sending module is configured for the access stratum of the terminal to send a slice recovery message to the non-access stratum when the access stratum of the terminal determines that the second cell supports the first intended slice; the slice recovery message is used for indicating that the second cell supports the first intended slice.

The normal service module is configured to instruct the access stratum of the terminal to execute normal service or normal transmission.

In a possible implementation, the normal service module further includes a second feedback information sending sub-module and a normal service sub-module.

The second feedback information sending sub-module is configured to instruct the non-access stratum to send second feedback information to the access stratum of the terminal.

The normal service sub-module is configured to instruct the access stratum of the terminal to execute normal service or normal transmission when the access stratum of the terminal receives the second feedback information.

In a possible implementation, the apparatus further includes a first operation determining module.

The first operation determining module is configured for the terminal or the access stratum of the terminal to determine, according to second information, whether to execute the first operation.

In a possible implementation, the second information is from a network device or the second information is predefined.

In conclusion, according to the solution provided in the embodiments of the present disclosure, when the second cell does not support the first intended slice, the terminal obtains first information indicating that the second cell does not support the first intended slice, and performs cell selection or reselection according to the first information. In the solution, in the case where the second cell does not support the intended slice, according to first information for indicating that the second cell does not support the first intended slice, the terminal performs cell selection or reselection, i. e. when the terminal performs cell selection or cell reselection, slice information supported by a cell is taken into consideration, thereby ensuring that the terminal can normally perform cell selection when the second cell does not support a slice, and avoiding loss of coverage.

It should be noted that, when the apparatus provided in the foregoing embodiment implements functions of the apparatus, division of the foregoing functional modules is used as an example for description. In actual applications, the foregoing functions may be allocated to different functional modules for implementation according to actual requirements, that is, a content structure of the apparatus is divided into different functional modules to implement all or a part of the foregoing functions.

With respect to the apparatus in the foregoing embodiments, the specific manner in which the modules execute the operations has been described in detail in the embodiments of the method, and is not described in detail herein.

Figure 9:
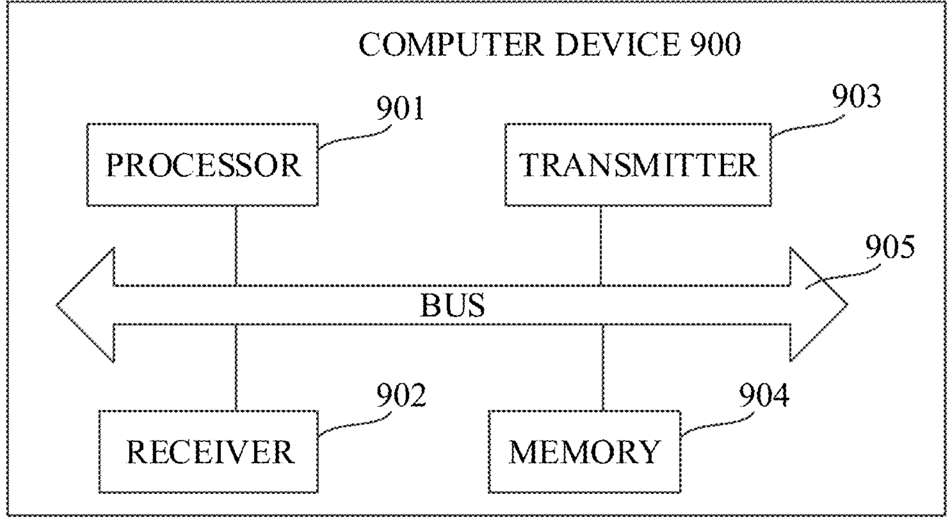
FIG. 9 illustrates a schematic structural diagram of a computer device provided in an embodiment of the present disclosure.

Please refer to FIG. 9, which illustrates a schematic structural diagram of a computer device 900 according to an embodiment of the present disclosure. The computer device 900 may include a processor 901, a receiver 902, a transmitter 903, a memory 904, and a bus 905.

The processor 901 includes one or more processing cores. The processor 901 executes various function applications and information processing by running software programs and modules.

The receiver 902 and the transmitter 903 may be implemented as one communication component, which may be a communication chip. The communication chip may also be referred to as a transceiver.

The memory 904 is connected to the processor 901 via the bus 905.

The memory 904 may be configured to store a computer program. The processor 901 is configured to execute the computer program, so as to implement each step executed by a server device, a configuration device, a cloud platform, or an account server in the foregoing method embodiments.

In addition, the memory 904 may be implemented by any type of volatile or non-volatile storage device or a combination thereof. The volatile or non-volatile storage device includes, but is not limited to, a magnetic disk or an optical disk, an electrically erasable programmable read-only memory, an erasable programmable read-only memory, a static random-access memory, a read-only memory, a magnetic memory, a flash memory, and a programmable read-only memory.

In an exemplary embodiment, the computer device includes a processor, a memory, and a transceiver (the transceiver may include a receiver and a transmitter, the receiver is configured to receive information, and the transmitter is configured to send information);

In a possible implementation, when the computer device is implemented as a terminal, the terminal includes a processor, a memory, and a transceiver.

The transceiver is configured to obtain first information, where the first information is used for indicating that the second cell does not support a first intended slice.

The processor is configured to instruct, according to the first information, the terminal to perform cell selection or reselection.

The processor and transceiver in the terminal involved in the embodiments of the present disclosure can execute the steps executed by the terminal in the cell selection method as illustrated in any one of the described FIG. 2 to FIG. 7, and will not be described again here.

Embodiments of the present disclosure further provide a computer readable storage medium. The storage medium stores a computer program, and the computer program is loaded and executed by a processor to implement each step of the cell selection method illustrated in any one of the foregoing FIG. 2 to FIG. 7.

The present disclosure further provides a computer program product or a computer program. The computer program product or the computer program includes a computer instruction. The computer instruction is stored in a computer readable storage medium. A processor of a computer device reads the computer instruction from a computer-readable storage medium, and the processor executes the computer instruction, so that the computer device executes each step in the cell selection method illustrated in any one of FIG. 2 to FIG. 5.

Those skilled in the art should appreciate that in one or more of the above examples, the functions described in the embodiments of the present disclosure may be implemented by hardware, software, firmware or any combination thereof. When implemented using software, the functions may be stored in a computer-readable medium or transmitted as one or more instructions or code on a computer-readable medium. Computer-readable media includes computer storage media and communication media, where communication media includes any medium that facilitates transfer of a computer program from one place to another. A storage medium may be any available media that can be accessed by a general purpose or special purpose computer.

The foregoing descriptions are merely exemplary embodiments of the present disclosure, but are not intended to limit the present disclosure. Any modification, equivalent replacement, and improvement made within the spirit and principle of the present disclosure shall belong to the scope of protection of the present disclosure.

What is claimed is:

1. A cell selection method, applied to a terminal and comprising:

obtaining first information by the terminal, wherein the first information is used for indicating that a second cell does not support a first intended slice, wherein the first intended slice is an intended slice supported by a first cell, the first cell is a cell currently selected or camped on by the terminal, and the second cell is different from the first cell; and performing cell selection or reselection by the terminal according to the first information;

wherein performing cell selection or reselection comprises at least one of:

considering the second cell as an acceptable cell;

falling back to a non-slice based cell selection or reselection rule;

ignoring a slice-based cell selection or reselection rule; or performing non-slice based cell selection or reselection;

wherein performing cell selection or reselection by the terminal according to the first information further comprises:

obtaining first indication information according to the first information;

determining a second cell-selection or reselection parameter as the cell selection or reselection parameter according to the first information, when the first indication information satisfies a second indication condition;

performing cell selection or reselection according to the cell selection or reselection parameter.

2. The method of claim 1, wherein the first information comprises system information.

3. The method of claim 1, wherein the second cell-selection or reselection parameter is obtained by the terminal from the first cell.

4. A terminal, comprising:

a processor, a memory, and a transceiver;

wherein the transceiver is configured to obtain first information, wherein the first information is used for indicating that a second cell does not support a first intended slice, wherein the first intended slice is an intended slice supported by a first cell, the first cell is a cell currently selected or camped on by the terminal, and the second cell is different from the first cell; and wherein the processor is configured to perform cell selection or reselection according to the first information, wherein cell selection or reselection comprises at least one of:

considering the second cell as an acceptable cell;

falling back to a non-slice based cell selection or reselection rule;

ignoring a slice-based cell selection or reselection rule; or performing non-slice based cell selection or reselection;

wherein the processor configured to perform cell selection or reselection according to the first information is further configured to:

obtain a first indication information according to the first information;

determine a second cell-selection or reselection parameter as the cell selection or reselection parameter according to the first information, when the first indication information satisfies a second indication condition;

perform cell selection or reselection according to the cell selection or reselection parameter.

5. The terminal of claim 4, wherein the first information comprises system information.

6. The terminal of claim 4, wherein the second cell-selection or reselection parameter is obtained by the terminal from the first cell.

7. A non-transitory computer readable storage medium, storing a computer program, wherein the computer program is executed by a processor to implement a cell selection method comprising:

obtaining first information by a terminal, wherein the first information is used for indicating that a second cell does not support a first intended slice, wherein the first intended slice is an intended slice supported by a first cell, the first cell is a cell currently selected or camped on by the terminal, and the second cell is different from the first cell; and performing cell selection or reselection by the terminal according to the first information;

wherein performing cell selection or reselection comprises at least one of:

considering the second cell as an acceptable cell;

falling back to a non-slice based cell selection or reselection rule;

ignoring a slice-based cell selection or reselection rule; or performing non-slice based cell selection or reselection;

wherein performing cell selection or reselection by the terminal according to the first information further comprises:

obtaining first indication information according to the first information;

determining a second cell-selection or reselection parameter as the cell selection or reselection parameter according to the first information, when the first indication information satisfies a second indication condition;

performing cell selection or reselection according to the cell selection or reselection parameter.

8. The non-transitory computer readable storage medium of claim 7, wherein the first information comprises system information.

9. The non-transitory computer readable storage medium of claim 7, wherein the second cell-selection or reselection parameter is obtained by the terminal from the first cell.

* * * * *